(12) United States Patent
Gabler

(10) Patent No.: US 9,212,003 B2
(45) Date of Patent: Dec. 15, 2015

(54) DETACHABLE TAB FOR A MODULAR BELT LINK

(71) Applicant: AMMERAAL BELTECH MODULAR A/S, Vejle (DK)

(72) Inventor: Tyson Gabler, New Cumberland, PA (US)

(73) Assignee: AMMERAAL BELTECH MODULAR A/S, Vejle (DK)

( * ) Notice: Subject to any disclaimer, the term of this patent is extended or adjusted under 35 U.S.C. 154(b) by 0 days.

(21) Appl. No.: 14/368,181

(22) PCT Filed: Dec. 20, 2012

(86) PCT No.: PCT/DK2012/050484
§ 371 (c)(1),
(2) Date: Jun. 23, 2014

(87) PCT Pub. No.: WO2013/091653
PCT Pub. Date: Jun. 27, 2013

(65) Prior Publication Data
US 2014/0367231 A1 Dec. 18, 2014

(30) Foreign Application Priority Data
Dec. 21, 2011 (DK) .................................. 2011 00991

(51) Int. Cl.
*B65G 17/06* (2006.01)
*B65G 15/30* (2006.01)
*B65G 17/08* (2006.01)

(52) U.S. Cl.
CPC .............. *B65G 15/30* (2013.01); *B65G 17/086* (2013.01); *B65G 2201/02* (2013.01); *B65G 2207/24* (2013.01); *B65G 2207/30* (2013.01)

(58) Field of Classification Search
CPC .......... B65G 17/06; B65G 17/12; B65G 17/16
USPC ..................................... 198/850–853
See application file for complete search history.

(56) References Cited

U.S. PATENT DOCUMENTS 5,247,789 A * 9/1993 Abbestam et al. ............. 198/851
7,967,132 B2 * 6/2011 Menke et al. .................. 198/853

FOREIGN PATENT DOCUMENTS

DE 203 10 360 U1 10/2003
(Continued)

OTHER PUBLICATIONS

International Search Report prepared by the European Patent Office on Feb. 25, 2013, for International Application No. PCT/DK2012/091653.

(Continued)

*Primary Examiner* — James R Bidwell
(74) *Attorney, Agent, or Firm* — Sheridan Ross PC

(57) ABSTRACT

A detachable tab for a modular belt link is provided. The detachable tab has upper and lower body portions. The upper body portion is suitable to be arranged in a modular conveyor belt module, and comprises a U-shaped section with two substantially parallel flanges that extend from a bridge member. Each flange has a distal end that terminates the flange away from the flange's connection to the bridge member. Each flange also has an inner side surface that faces the other flange and an outer side surface that faces away from the flanges. The lower body portion comprises three distinct sections: a first section that connects a second section to the bridge member of the upper body portion; a second section that projects in a direction opposite and parallel to the flanges of the upper body portion; and a third section that is arranged substantially perpendicular to the second section.

14 Claims, 3 Drawing Sheets

(56) References Cited

FOREIGN PATENT DOCUMENTS

| EP | 0 931 736 A2 | 7/1999 |
| EP | 1655242 | 5/2006 |
| WO | WO 95/28343 | 10/1995 |
| WO | WO 2007/076532 A2 | 7/2007 |
| WO | WO 2009/106976 A1 | 9/2009 |

OTHER PUBLICATIONS

International Search Report for International (PCT) Patent Application No. PCT/DK2012/050484 mailed Mar. 1, 2013, 2 pages.
International Preliminary Report on Patentability for International (PCT) Patent Application No. PCT/DK2012/050484 dated Jun. 24, 2014, 7 pages.

* cited by examiner

DETACHABLE TAB FOR A MODULAR BELT LINK

CROSS REFERENCE TO RELATED APPLICATIONS

This application is a national stage application under 35 U.S.C. 371 and claims the benefit of PCT Application No. PCT/DK2012/050484 having an international filing date of Dec. 20, 2012, which designated the United States, which PCT application claimed the benefit of Danish Application No. PA 2011 00991 21, filed on Dec. 21, 2011, both of which are incorporated herein by reference in their entirety.

FIELD OF THE INVENTION

The present invention relates to a detachable tab for a modular belt link as well as a belt link incorporating such a tab.

BACKGROUND OF THE INVENTION

In the art of conveyors made from the assembly of a large number of substantially identical modular belt links there are generally two types of conveyors, i.e. straight running and flexible conveyors. The present invention is particularly directed to the so-called flexible conveyors, i.e. conveyors which may be used in conveyor systems where turns or gradients are encountered, but may also be used for straight-running conveyors.

When a conveyor belt of the type mentioned above runs through a turn, be it a single turn in a conveyor path or in a spiral conveyor having a substantially constant turn, the outermost edge of the conveyor belt will have a tendency to lift itself up from the underlying carrying structure due to the tensions arising in the belt. In order to counter this it is quite widespread to provide means underneath the belt, typically by providing special edge modules which are provided with means for holding down the belt such that the belt will be in steady contact with the underlying structure at least when the belt would otherwise lift itself off the sub-structure. Thereby is created a smoother travel of the belt in relation to the substructure. One such means is a tab which projects downwards and outwards such that it may engage a special flange provided in the substructure whereby the modular conveyor belt in this manner is physically guided vertically by the substructure, but may naturally move completely free in the transport direction which normally is substantially horizontal. This solution normally requires that at least two types of belt modules are used, i.e. a standard belt module for the major part of the conveyors load carrying surface and a special edge module comprising such a downwardly projecting tab in each row.

Although this is a widespread solution it does have some drawbacks which the present invention addresses. Among these drawbacks is the fact that when constructing a modular conveyor belt of the type mentioned above two different types of modules must be used such that the robots or personnel assembling the modular belt must pay special attention to placing the special modules in the correct positions. This in turn requires at least two different sets of moulds for providing injection moulding equipment for manufacture of the modular belt links. A further disadvantage is the fact that depending on how many turns and how sharp these turns are the tab is exposed to excessive wear such that usually the tab will wear out much faster than the conveyor belt module as such, which in turn will require replacement at least of the edge modules a long time before they have expired their active service life, had they been regular modular belt links.

DESCRIPTION OF THE INVENTION

The invention therefore provides a detachable tab for a modular belt link which tab has an upper and lower body portion wherein
  the upper body portion is suitable to be arranged in a modular conveyor belt module, where said upper body portion comprises a U-shaped section, having two substantially parallel flanges, upstanding from a bridge member, where the flanges each has a distal end terminating the flange away from the flange's connection to the bridge member, and an inner side surface facing the other flange and an outer side surface facing away from the flanges, and where
  the lower body portion comprises three distinct sections:
  a first section connecting a second section to the bridge member of the upper body portion, where said
  second section is projecting in a direction opposite and parallel to the flanges of the upper body portion, and where a
  third section is arranged substantially perpendicular to said second section.

Typically, the modular belt links have forward and rearward projecting eye portions spaced by openings such that it is possible to intercalate eye portions in openings on modular belt links in adjacent rows. The adjacent modular belt links are thereafter assembled typically by inserting a connection pin in a lateral direction through overlapping apertures in the eye parts thereby hingely connecting adjacent modular belt link rows. The belt links may also be connected as suggested in the same applicant's European patent EP 1655242 where projections are provided on either side of the eye portions along one edge of the belt link whereas the opposite edge of the eye portions are provided with apertures suitable to receive the projections whereby adjacent modular belt links are assembled in a pinless manner by inserting the projections in the apertures on adjacent belt links thereby creating a hinge connection having more or less the same features as provided by the more traditional pin connections.

By dimensioning the detachable tab according to the present invention such that it will fit inside the openings between adjacent eye part portions and at the same time not interfere with the insertion of an eye portion in the opening it is possible to refit a standard modular belt link with tabs being able to carry out the function as described in the introductory part of this description, i.e. keeping the modular belt conveyor in contact with the substructure. It is also possible to replace damaged or worn tabs.

In a further embodiment of the invention the bridge member extends at least beyond one side of the flanges. In this manner stability is added to the connection between the detachable tab and the modular belt link. This is particularly important in applications where the loads on the conveyor belt may vary considerably such that also tension in the belt may vary creating movements in the conveyor belt relative to the substructure.

In a still further advantageous embodiment of the invention the bridge member between the two upstanding flanges covers up to 60% of the area between the flanges, more preferred up to between 40% and 50% of the area. In this configuration the detachable tab does not interfere with the free movement of the eye part relative to the openings between two eye parts and an adjacent belt link whereby the conveyor belt's ability to collapse or expand when going through a turn and also its hinge-like capability, i.e. turn adjacent belt links out of plane relative to each other is maintained.

In a still further advantageous embodiment of the invention each of the flanges of the upper body portion is provided with an aperture where said aperture connects the inner and outer surfaces, and that the distance between the distal ends of the flange and the centre of the apertures in use is smaller or equal to the distance between the centre of the aperture provided in a modular belt link and the upper surface of said modular belt link.

With this configuration of the apertures relative to the distal end of the flanges the detachable tab may be arranged in the openings between adjacent eye part portions such that the apertures of the detachable tab overlap with the apertures provided in the modular belt links, which allows for easy assembly of adjacent belt links by inserting the connection pin through the eye parts of the adjacent modular belt links and the apertures provided in the flanges of the detachable tab. By making sure that the flanges do not extend above the surface of the modular belt link it is also ensured that the flanges do not interfere with the normal workings of the surface of the conveyor belt.

Often the surfaces are designed for special purposes depending on the applications to which they are used, and in this manner the detachable tab's construction does not interfere with the overall modular belt link construction.

In a still further advantageous embodiment of the invention an apertures is provided in each of the flanges on the upper section, where said aperture is open towards the distal end and at least one side surface of the flanges, and where each aperture from the opening away from the distal end has a neck portion opening up to a substantially circular round section.

This configuration of the apertures provided in the flanges corresponds to the pinless connection means described in the applicant's own previous European patent EP 1655242.

In a further advantageous embodiment the outer side surface of the flanges are provided with projecting means for attaching the tab to a modular belt module. In this manner the flanges are provided with means for orienting the detachable tab as it is inserted in the modular belt link where it is foreseen that the modular belt link shall be provided with a slit which is suitable to receive the projecting means when attaching the detachable tab to a modular belt module.

In a still further advantageous embodiment the bridge member and the first section may be an integrated unit, such that in use the bridge and first member are positioned below a lower edge of a module in a modular conveyor belt. Depending on the construction of the sub-structure, i.e. the structure which is usually made from steel and is the load carrying and guiding structure for the conveyor belt's travel it will be possible to integrate the bridge member and the first section which will provide for a stronger tab and at the same time be space-saving.

In a further advantageous embodiment the tab is made from a polymer material, where said material has a Shore A hardness of 65 or more. By providing a Shore A hardness of 65 or more the tab will in addition to having the holding down function as described above also have wear characteristics allowing for a very long life expectancy such that although the modular belt links are made from a lesser wear resistant material, the overall construction will have very good wear capabilities as most of the wear in these types of applications arises from the contact between parts of the modular belt and the substructure and in particular when the modular belt links are provided with tabs between the tab and guide means for guiding/holding down the modular belt links relative to the substructure. In this manner, by being made from a very tough material such as indicated by Shore A hardness of 65 or more a very durable conveyor belt is constructed where the expensive parts being exposed to wear are kept to a minimum such that the overall cost of such a belt may be lowered.

In a further advantageous embodiment of the invention the tab is made from a polymer material, where said material is electrically conductive. In this manner it becomes possible to ground the construction very easily in that any current generated by travel or activities on the modular conveyor belt will effectively be guided down to the substructure which as already mentioned above traditionally is made from steel which in a traditional manner may be grounded thereby removing any static electricity and the dangers associated with static electricity from the conveyor belt structure.

In a still further advantageous embodiment the tab is made from a polymer material, where said material is fibre reinforced providing a high ductility. The ductility ensures that if the tab is exposed to excessive loads which may arise when a very uneven load is placed on the conveyor belt these forces do not tear apart the detachable tab thereby destroying the modular conveyor belt.

In yet a further embodiment of the invention a third flange is provided, which flange is substantially parallel to the other flanges and arranged at a distance to the nearest flange, where said third flange in use will be adjacent an outer limitation of the modular belt link.

The provision of a third flange, which in use will be on the outside of the modular conveyor belt, i.e. laterally between the conveyor belt and the steel structure on which the conveyor belt is arranged, opens up a number of further possibilities and advantages. The extra width of the flange laterally may be used to adapt a new conveyor belt to an existing conveyor structure. By varying the width of the flange suitable detachable tabs may be manufactured, such that a standard belt may be modified to fit an existing structure. This possibility provides substantial savings.

A further possibility is to manufacture the detachable tab from a wear resistant material, for example a material comprising carbon in the shape of Kevlar or other similar materials. As the conveyor belt wears, it is mainly the detachable tabs which are exposed to the wear. These may be replaced at a much lower cost than replacing the entire conveyor belt.

As already mentioned above, the invention is also directed at a conveyor belt incorporating a detachable tab as already described above. Naturally, such a conveyor belt will, depending on the embodiment of the tab, inherit the advantageous features provided with the present invention.

DESCRIPTION OF THE DRAWING

The invention will now explained with reference to the accompanying drawings wherein.

DETAILED DESCRIPTION OF THE INVENTION

Figure 1:
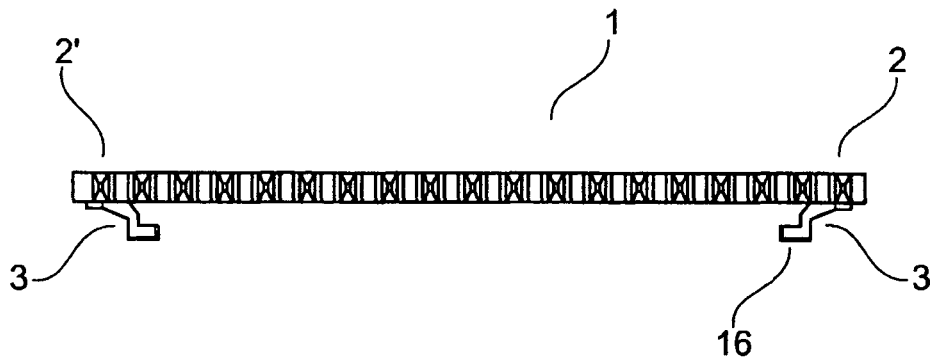
FIG. 1 illustrates a cross-section through a conveyor belt of the side-flexing type

I FIG. 1 is illustrated a cross-section through a conveyor belt 1 of the side-flexing type. The conveyor belt may comprise a number of individual, but substantially identical injection moulded plastic modular belt links assembled in the lateral direction as well as in the lengthwise direction of the conveyor belt. In order to keep the sides 2, 2' of the conveyor belt 1 down through turns the conveyor belt 1 is provided with tabs 3 according to the invention. In the illustrated embodiment tabs 3 are provided in both sides 2, 2' of the conveyor belt as it is foreseen that this conveyor belt 1 may turn both to the left and to the right through its conveying course.

Figure 2:
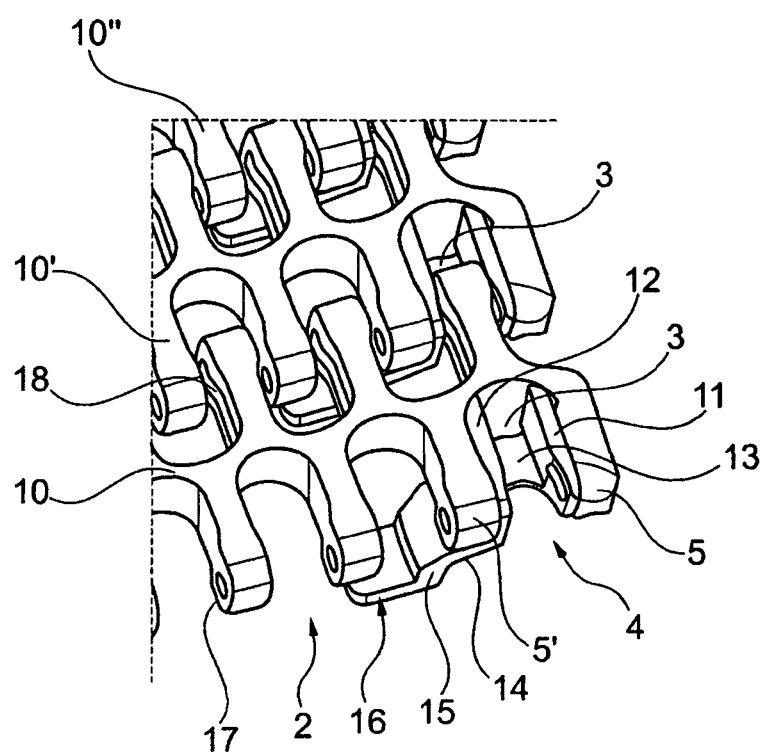
FIG. 2 illustrates a side section in more detail.

Turning to FIG. 2 a side section 2 is illustrated in more detail. A number of substantially identical modular belt links 10, 10', 10'' are illustrated only partly. Each substantially identical conveyor belt link 10, 10', 10'' is provided with a detachable tab 3 arranged in an opening 4 between two eye parts 5, 5'.

The construction of the modular belt links 10, 10', 10'' will not be explained in further detail as these are very well known in the art and with respect to the inventive detachable tab 3 the construction of the modular belt links is not important apart from the provision of the eye parts 5, 5' separated by opening 4.

In FIG. 2 the conveyor belt 1 is seen from above, such that the tab 3 projects underneath the conveying surface as illustrated. The detachable tab 3 comprises two substantially parallel flanges 11, 12 which are connected by a bridge 13. The bridge connects the flanges 11 to a lower body portions which comprises three distinct sections 14, 15, 16. The third section 16 is arranged substantially parallel to the conveyor belt's load carrying surface as is evident from FIG. 1, whereas the first and second sections 14, 15 are dimensioned such that when the detachable tab 3 is arranged in a side section 2 of a conveyor belt, the second and third sections 15, 16 will engage the support structure (not illustrated) of the sub-section. The third section 16 will provide a firm engagement against upward movement whereas the second section 15 will guide and/or resist against lateral movement such that the conveyor belt 1 will be securely guided by the substructure through its intended travel path.

In the illustrated embodiment the eye parts 5, 5' are dimensioned such that the opening 4 between two adjacent eye parts is larger than the width dimension of the eye parts 5, 5' such that when the adjacent modular belt links 10, 10', 10'' are assembled, there will be a certain play between the adjacent belt links. The detachable tab 3 fills up at least part of this play such that less sideways movement is possible.

As is evident from the illustrative embodiment of FIG. 2 the eye parts on either side of the modular belt link 10, 10', 10'' are provided with circular apertures 17 on one side and oblong apertures 18 on the opposite side. The dimension of the apertures determines the conveyor belt's 1 ability to sideflex. Therefore, by inserting a detachable tab 3 in the openings in a side section 2 of a conveyor belt, the conveyor belt's ability to turn around a given radius may be limited which also has advantages in that it is often desired to create a conveyor belt with a determined radius especially when conveyor belts are designed for a certain turning radius it will travel more smoothly through the turns without any hacking or buckling.

Figure 3:
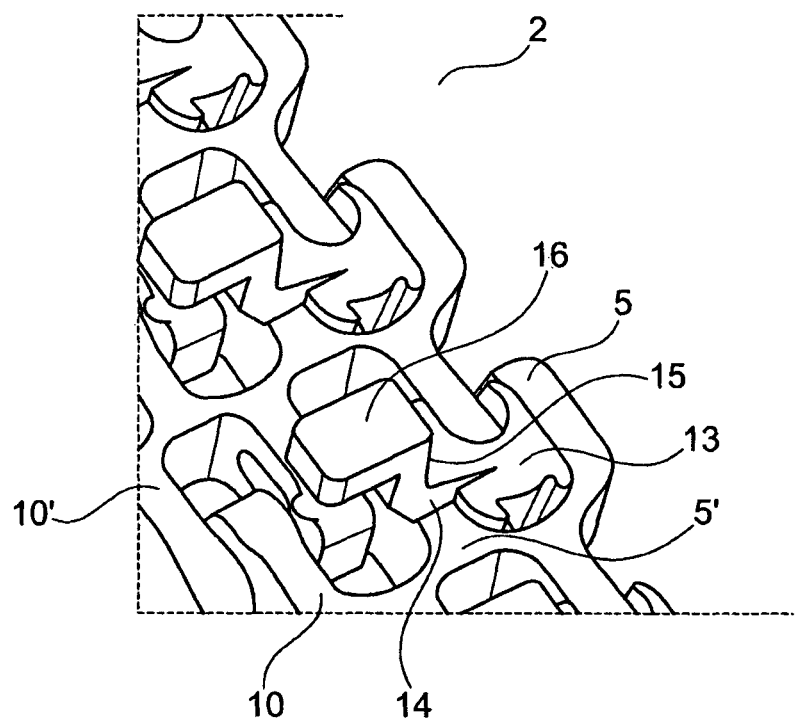
FIG. 3 illustrates the same side section as illustrated in FIG. 2 seen from below.

Turning to FIG. 3 the same side section 2 as illustrated in FIG. 2 is seen from below. In this view the first, second and third sections 14, 15, 16 are clearly visible and the first section's 14 connection to the bridge member 13 is also visible. Furthermore, it may be seen that the bridge member 13 only covers part of the area between two adjacent eye parts 5, 5'. By only covering part of the area, the bridge member 13 does not hinder the conveyor belt in travelling up and down where one modular belt link 10' will pivot out of a horizontal plane with respect to an adjacent modular belt link 10.

Figure 4:
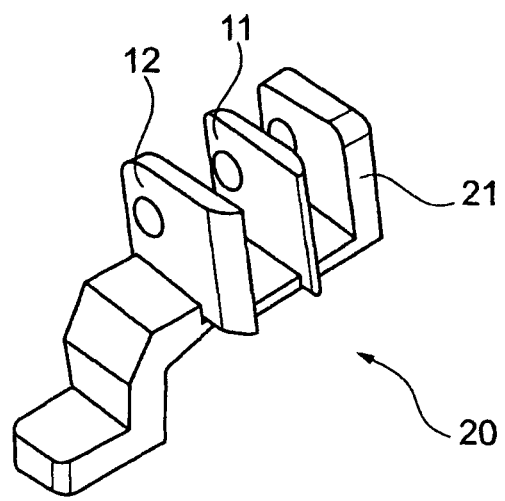
FIG. 4 illustrates a further embodiment of the inventive detachable tab

Turning to FIG. 4 a further embodiment of the inventive detachable tab is illustrated. It is foreseen that the detachable tab may be manufactured from any suitable material, for example from a polymer material having very good wear capabilities. In this embodiment illustrated in FIG. 4 the detachable tab 20 is special in that integrated with the tab 20 is a third flange functioning as a wear plate 21 such that as the tab 20 is inserted in the same manner as explained above with reference to FIGS. 2 and 3 the wear plate 21 will be positioned outside the modular belt link 10 and thereby protect the side edges of the conveyor belt 1 when it comes into contact with the substructure. This is especially advantageous in that wear and tear will occur on a detachable and thereby replaceable part, namely the tab 20 and not on the entire conveyor belt which is thereby given a longer life. Naturally, the mutual distances between the wear plate 21 and the flanges 11, 12 is such that the tab 20 may be interfitted in a conveyor belt module as described above.

Figure 5:
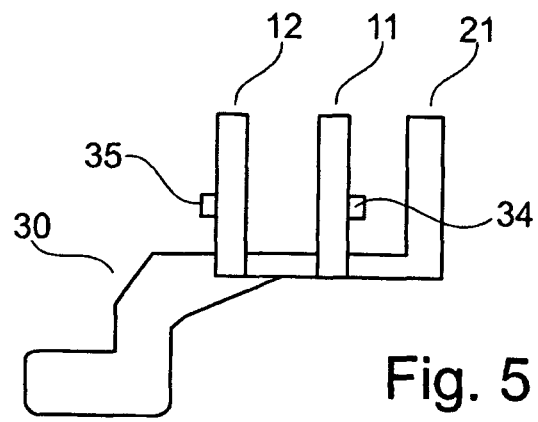
FIGS. 5 and 6 illustrate further embodiments of the invention
Figure 6:
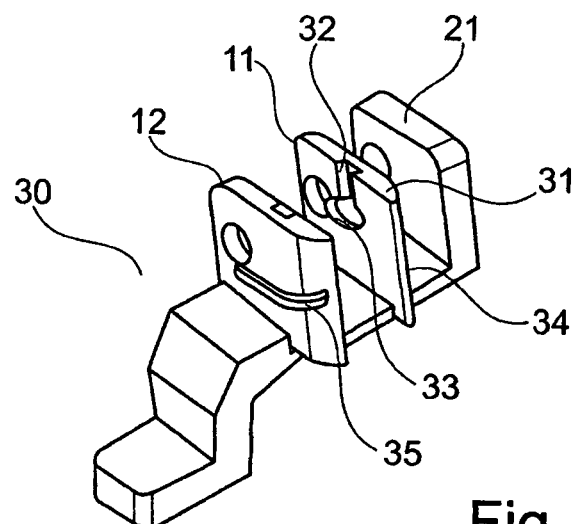

Turning to a further embodiment of the invention depicted in FIGS. 5 and 6 the tab 30 is in this embodiment foreseen to be arranged in a conveyor belt where the method of assembling adjacent modular belt modules is different from the method of assembly of belt modules depicted in FIGS. 2, 3 and 4. In FIGS. 2, 3 and 4 adjacent belt modules are assembled by inserting a connection rod (not illustrated) through overlapping apertures 17, 18 in intercalated eye parts 5, 5'.

Figure 7:
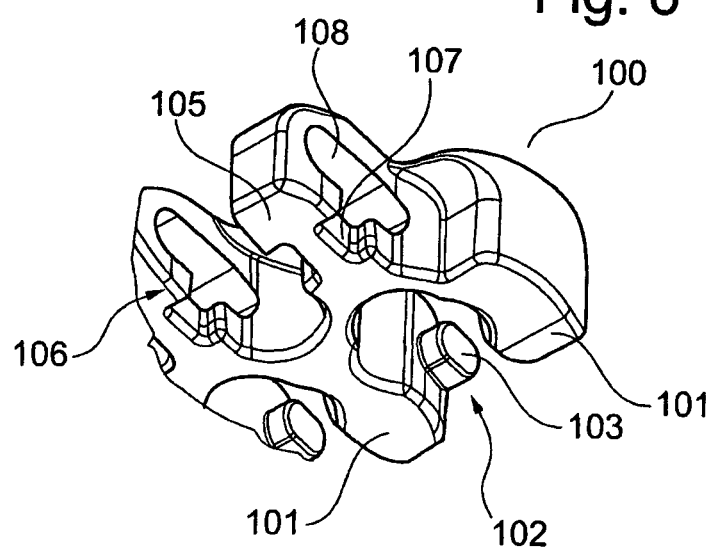
FIG. 7 illustrates a figure taken from the applicant's prior patent EP 1655242.

In the same applicant's earlier published European patent EP 1655242 adjacent belt links are assembled as will be explained with reference to FIG. 7 which is a figure taken from the applicant's prior patent. The belt link 100 comprises eye parts 101 separated by openings 102 quite comparable to the modular belt links described with reference to FIGS. 2-4. Instead of the apertures 17, 18, see FIG. 2, eye parts 101 on one side of the modular belt link is provided with projections 103, which projections 103 projects laterally from the side walls of the eye parts 101 into the openings between adjacent eye parts. Eye parts 105 arranged opposite to the eye parts 101, are provided with keyhole shaped apertures or indentations 106 where the keyhole shaped apertures comprise a neck portion 107 and an oblong aperture 108. Although the keyhole shaped aperture 106 in FIG. 7 is illustrated to be going through the eye part 105 from sidewall to sidewall, it may also only be shaped as an indentation in the side wall of the eye part 105, i.e only have a depth less than the thickness of the eye part. The neck portion 107 is dimensioned such that the projection 103 may pass through the neck portion 107 and be accommodated in the oblong aperture 108 thereby providing the flexibility which the oblong apertures 18 provide in the embodiment illustrated with reference to FIG. 2.

In order for the detachable tab 30 to accommodate the notches for the type of conveyor belts constructed as illustrated with reference to FIG. 7 the detachable tab 30 depicted in FIGS. 5 and 6 is provided with keyhole shaped apertures 31 where said apertures comprise a neck portion 32 and a circular or oblong aperture 33 for accommodating the projections 103 in use. In this embodiment the flanges 11, 12 are provided with ridges 34, 35 such that as the detachable tab 30 is mounted in a modular conveyor belt module these ridges 34, 35 may be accommodated in corresponding slots provided in the sidewalls of the eye parts of the modular belt links. These aspects of the modular belt links are not illustrated, but will be recognized by the skilled person. The embodiment illustrated in FIGS. 5 and 6 is furthermore provided with the wear plate 21, but obviously detachable tabs 30 without wear plates 21 may also be used.

The invention claimed is:

1. A detachable tab for a modular belt link, wherein the detachable tab has upper and lower body portions, comprising:

the upper body portion is suitable to be arranged in a modular conveyor belt module, where said upper body portion comprises a U-shaped section, having two substantially parallel flanges, upstanding from a bridge member, where the flanges each has a distal end terminating the flange away from the flange's connection to the bridge member, and an inner side surface facing the other flange and an outer side surface facing away from the flanges;

the lower body portion comprises three distinct sections;

a first section connecting a second section to the bridge member of the upper body portion;

a second section is projecting in a direction opposite and parallel to the flanges of the upper body portion;

a third section is arranged substantially perpendicular to said second section; and wherein each of the flanges of the upper body portion is provided with an aperture where said aperture connects the inner and outer surfaces, and that a distance between the distal ends of the flange and the centre of the apertures is smaller or equal to the distance between the centre of the aperture provided in a modular belt link and the upper surface of said modular belt link.

2. The detachable tab according to claim 1 wherein said bridge member extends beyond one side of the flanges.

3. The detachable tab according to claim 1 wherein the bridge member between the two upstanding flanges covers up to 60% of the area between the flanges.

4. The detachable tab according to claim 1 wherein an aperture is provided in each of the flanges on the upper section, where said aperture is open towards the distal end and at least one side surface of the flanges, and where each aperture from the opening away from the distal end has a neck portion opening up to a substantially circular round section.

5. The detachable tab according to claim 1 wherein the outer side surfaces of the flanges are provided with projecting means for attaching the tab to a modular belt module.

6. The detachable tab according to claim 1 wherein the bridge member and the first section may be an integrated unit, such that in use the bridge and first member are positioned below a lower edge of a module in a modular conveyor belt.

7. The detachable tab according to claim 1 wherein the tab is made from a polymer material, and wherein said material has a Shore A hardness of 65 or more.

8. The detachable tab according to claim 1 wherein the tab is made from a polymer material, wherein said material is comprised of at least one of Nylon®, or Delarin® or a Kevlar® material.

9. The detachable tab according to claim 1 wherein a third flange is provided, which is substantially parallel to the other flanges and arranged at a distance to the nearest flange, where said third flange in use will be adjacent an outer limitation of the modular belt link.

10. The modular conveyor belt link of claim 1, which is assembled from a plurality of substantially identical modular belt links, wherein at least along one side edge a plurality of modular belt links are provided with the detachable tab.

11. The detachable tab according to claim 1 wherein said bridge member extends beyond both sides of the flanges.

12. The detachable tab according to claim 1 wherein the bridge member between the two upstanding flanges covers up to between 40% and 50% of the area between the flanges.

13. The detachable tab according to claim 1 wherein the tab is made from a polymer material, and wherein said material is electrically conductive.

14. The detachable tab according to claim 1 wherein the tab is made from a polymer material, and wherein said material is fibre reinforced to provide a high ductility.

* * * * *